United States Patent
Zhu (10) Patent No.: US 11,428,559 B2
(45) Date of Patent: Aug. 30, 2022

(54) CORIOLIS MASS FLOW METER WITH TWO PAIR OF MEASURING TUBES HAVING TWO EXCITATION MODE NATURAL FREQUENCIES AND METHOD OF USE

(71) Applicant: Endress+Hauser Flowtec AG, Reinach (CH)

(72) Inventor: Hao Zhu, Freising (DE)

(73) Assignee: ENDRESS+HAUSER FLOWTEC AG, Reinach (CH)

(*) Notice: Subject to any disclaimer, the term of this patent is extended or adjusted under 35 U.S.C. 154(b) by 348 days.

(21) Appl. No.: 16/759,523

(22) PCT Filed: Oct. 2, 2018

(86) PCT No.: PCT/EP2018/076814
§ 371 (c)(1),
(2) Date: Apr. 27, 2020

(87) PCT Pub. No.: WO2019/081170
PCT Pub. Date: May 2, 2019

(65) Prior Publication Data
US 2020/0278231 A1   Sep. 3, 2020

(30) Foreign Application Priority Data

Oct. 27, 2017  (DE) ..................... 10 2017 125 273.8

(51) Int. Cl.
*G01F 1/84* (2006.01)
(52) U.S. Cl.
CPC .......... *G01F 1/8436* (2013.01); *G01F 1/8422* (2013.01); *G01F 1/8427* (2013.01); *G01F 1/8431* (2013.01); *G01F 1/8477* (2013.01)

(58) Field of Classification Search
None
See application file for complete search history.

(56) References Cited

U.S. PATENT DOCUMENTS 6,311,136 B1   10/2001   Henry et al.
9,593,978 B2 *  3/2017   Dondoshansky ......... G01F 1/84
(Continued)

FOREIGN PATENT DOCUMENTS

CN   101421593 A   4/2009
CN   100501346 C   6/2009
(Continued)

*Primary Examiner* — Harshad R Patel
(74) *Attorney, Agent, or Firm* — Christopher R. Powers; Endress+Hauser (USA) Holding Inc.

(57) ABSTRACT

The present disclosure relates to a mass flow meter according to the Coriolis principle, comprising two measuring tube pairs which have different usage mode natural frequencies, an exciter for exciting flexural vibrations and a vibration sensor pair for detecting flexural vibrations; and comprising a circuit for driving the exciters and for detecting signals of the vibration sensors, for determining flow-dependent phase differences between the signals of the inlet-side and outlet-side vibration sensors and for determining mass flow measurement values based on the flow-dependent phase differences, wherein the circuit is configured to perform, when determining the mass flow measurement values based on the flow-dependent phase differences, a zero-point correction for the first measuring tube pair and/or the second measuring tube pair using signal amplitude ratios of the measuring tube pairs.

20 Claims, 5 Drawing Sheets

(56) References Cited

U.S. PATENT DOCUMENTS

2006/0016273 A1* 1/2006 Bitto .................. G01F 1/8495
73/861.355
2009/0272173 A1 3/2009 Hasunuma et al.

FOREIGN PATENT DOCUMENTS

| | | |
|---|---|---|
| CN | 101501457 A | 8/2009 |
| CN | 101946165 A | 1/2011 |
| CN | 102460083 A | 5/2012 |
| DE | 102004035971 A1 | 2/2006 |
| DE | 102014118367 A1 | 6/2016 |
| DE | 102015104931 A1 | 6/2016 |
| EP | 0831306 A1 | 3/1998 |
| JP | 10160542 A | 6/1998 |
| WO | 2004099733 A1 | 11/2004 |

\* cited by examiner

CORIOLIS MASS FLOW METER WITH TWO PAIR OF MEASURING TUBES HAVING TWO EXCITATION MODE NATURAL FREQUENCIES AND METHOD OF USE

CROSS-REFERENCE TO RELATED APPLICATIONS

The present application is related to and claims the priority benefit of German Patent Application No. 10 2017 125 273.8, filed on Oct. 27, 2017, and International Patent Application No. PCT/EP2018/076814, filed on Oct. 2, 2018, the entire contents of which are incorporated herein by reference.

TECHNICAL FIELD

The present invention relates to a mass flow meter according to the Coriolis principle having at least two measuring tube pairs, wherein the two measuring tube pairs have different excitation mode natural frequencies for a respective flexural vibration excitation mode, and to a method for determining the mass flow.

BACKGROUND

A generic mass flow meter is described in DE 10 2015 104 931 A1. The differing excitation mode natural frequencies are advantageously to minimize crosstalk between the vibrations of the measuring tube pairs.

The measuring tube pairs each have an electrodynamic exciter for exciting flexural vibrations and in each case two vibration sensors for detecting flexural vibrations, the vibration sensors of a measuring tube pair being arranged in each case on the inlet side and on the outlet side. Basically, each measuring tube pair can be equipped per se with an independent operation and evaluation circuit for driving the exciter and for detecting sensor signals, which, however, considerably increases the circuit complexity compared with a conventional mass flow meter with only one measuring tube pair. It is therefore desirable to provide only one operation and evaluation circuit which drives the exciters of both measuring tube pairs via a common exciter conductor loop and detects the signals of the inlet-side vibration sensors of both measuring tube pairs as well as the signals of the outlet-side vibration sensors of both measuring tube pairs in each case via an inlet-side or outlet-side sensor conductor loop.

In this case, a zero-point error may occur due to the different natural frequencies in combination with manufacturing tolerances, as will be explained below.

In mass flow meters based on the Coriolis principle, a phase shift proportional to flow between the signals of an inlet-side vibration sensor and an outlet-side vibration sensor is detected. For this purpose, especially the phase difference of the respective maxima of the signals is detected when passing through the rest position.

Manufacturing tolerances can lead to the inlet-side and outlet-side vibration sensors being of different sensitivities and thus having different signal amplitudes with the same vibration behavior. In the case of a mass flow meter with only one measuring tube pair, this is harmless since the signals do not undergo a phase change due to amplitude variations. This changes when the sensor signals of two measuring tube pairs with different natural frequencies are superimposed. The flexural vibration excitation mode of a measuring tube pair is excited with their excitation mode natural frequency. This results in a maximum amplitude and a phase angle of $\pi/2$ between the exciter signal and the deflection. Since the exciters of both measuring tube pairs are driven via a common exciter conductor loop in the configuration described above, each measuring tube pair is also excited with the natural frequency of the flexural vibration excitation mode of the other measuring tube pair with its differing excitation mode natural frequency. This leads to a superimposed vibration apart from resonance with a considerably lower amplitude and a phase angle of 0 or $\pi$ between the exciter signal and the deflection. The superimposed vibration of a measuring tube pair at the excitation mode natural frequency of the other measuring tube pair therefore has a phase shift of $\pm\pi/2$ relative to its vibration in resonance. Since the signals of the vibration sensors of both measuring tube pairs are detected via common sensor conductor loops, the signals of the vibration sensors of this measuring tube pair vibrating in resonance as well as the signals of the vibration sensors of the forced vibrations of the other measuring tube pair are superimposed at the excitation mode natural frequency of one measuring tube pair, the latter being shifted by $\pm\pi/2$ with respect to the former.

The superposition of sensor signals of two measuring tube pairs with different amplitude ratios, between inlet-side and outlet-side sensors, can therefore result in a phase difference between the signals which cause a zero-point error of the mass flow meter.

Therefore, the object of the present invention is to find a remedy.

SUMMARY

The object is achieved according to the invention by the mass flow meter according to independent claim 1 and by the method according to claim 15.

The mass flow meter according to the invention based on the Coriolis principle for determining a mass flow measurement value of a medium flowing through the mass flow meter comprises: a first measuring tube pair with two measuring tubes which are mounted so as to be able to vibrate against one another, with a flexural vibration excitation mode having a first medium-dependent excitation mode natural frequency f1; a first electrodynamic exciter for exciting flexural vibrations between the measuring tubes of the first measuring tube pair; a first vibration sensor pair having a first inlet-side vibration sensor and a first outlet-side vibration sensor for detecting flexural vibrations at two points on the first measuring tube pair; a second measuring tube pair with two measuring tubes which are mounted so as to be able to vibrate against one another, with a flexural vibration excitation mode having a second medium-dependent excitation mode natural frequency f2; a second electrodynamic exciter for exciting flexural vibrations between the measuring tubes of the second measuring tube pair; a second vibration sensor pair having a second inlet-side vibration sensor and a second outlet-side vibration sensor for detecting flexural vibrations at two points on the second measuring tube pair; an operation and evaluation circuit; for driving the first and second electrodynamic exciters with a common exciter signal and for detecting signals of the vibration sensors; for determining flow-dependent phase differences between the signals of the inlet-side and outlet-side vibration sensors of one of the vibration sensor pairs and for determining mass flow measurement values on the basis of these flow-dependent phase differences; wherein the exciter signal is used for exciting the flexural vibration excitation modes of both measuring tube pairs; wherein an exciter signal path is configured to transmit the exciter signal to the first and second electrodynamic exciters; wherein an inlet-side sensor signal path is configured to transmit signals of the first and second inlet-side vibration sensors in a superimposed manner; wherein an outlet-side sensor signal path is configured to transmit signals of the first and second outlet-side vibration sensors in a superimposed manner; wherein the sensor signals at vibrations with the first excitation mode natural frequency f1 have a first signal amplitude ratio between the signals of the inlet-side sensors and the signals of the outlet-side sensors, wherein the sensor signals at vibrations with the second excitation mode natural frequency f2 have a second amplitude ratio between the signals of the inlet-side sensors and the signals of the outlet-side sensors, wherein the second signal amplitude ratio due to manufacturing tolerances can differ from the first signal amplitude ratio, wherein the operation and evaluation circuit is configured to carry out a zero-point correction for the first measuring tube pair and/or the second measuring tube pair taking into account the first and second signal amplitude ratios or variables equivalent thereto when determining the mass flow measurement values on the basis of phase differences.

Equivalent to the first and second signal amplitude ratios in the sense of the invention are, for example, the ratio of the signal amplitude of the inlet-side sensor of the first measuring tube pair to the signal amplitude of the inlet-side sensor of the second measuring tube pair together with the ratio of the signal amplitude of the outlet-side sensor of the first measuring tube pair to the signal amplitude of the outlet-side sensor of the second measuring tube pair.

In a development of the invention, the operation and evaluation circuit is configured to carry out the zero-point correction for the first measuring tube pair and/or the second measuring tube pair as a function of a mutual deviation of the signal amplitude ratios or variables equivalent thereto.

In a development of the invention, the zero-point correction for the first measuring tube pair has an term which depends on the current vibration amplitudes of the vibration sensors of the second measuring tube pair at the first excitation mode natural frequency f1 in relation to the current vibration amplitudes of the vibration sensors of the first measuring tube pair at the first excitation mode natural frequency.

In a development of the invention, the zero-point correction for the second measuring tube pair has a term which depends on the current vibration amplitudes of the vibration sensors of the first measuring tube pair at the second excitation mode natural frequency in relation to the current vibration amplitudes of the vibration sensors of the second measuring tube pair at the second excitation mode natural frequency.

In a development of the invention, the operation and evaluation circuit is configured, in order to determine the vibration amplitudes of the vibration sensors of the first measuring tube pair, to estimate a mean sensor amplitude function $A_1'(f_1, f_2, I_2)$ at the excitation mode natural frequency of the second measuring tube pair, wherein $f_1, f_2$ are the resonance frequencies of the flexural vibration excitation modes of the first and second measuring tube pairs, wherein $I_2$ is an excitation current signal with the excitation mode natural frequency of the second measuring tube pair $f_2$, wherein the amplitudes of the inlet-side and outlet-side vibration sensors are determined as proportional to the mean sensor amplitude function, In a development of the invention, the operation and evaluation circuit is configured, in order to determine the vibration amplitudes of the vibration sensors of the second measuring tube pair, to estimate a mean sensor amplitude function $A_2'(f_2, f_1, I_1)$ at the excitation mode natural frequency of the first measuring tube pair, wherein $f_2, f_1$ are the resonance frequencies of the flexural vibration excitation modes of the second and first measuring tube pairs, wherein $I_1$ is an excitation current signal with the excitation mode natural frequency of the first measuring tube pair $f_1$, wherein the amplitudes of the inlet-side and outlet-side vibration sensors are determined as proportional to the mean sensor amplitude function.

In a development of the invention, the operation and evaluation circuit is configured to estimate a vibration amplitude $A'_{in,1}$ of an inlet-side sensor of a first measuring tube pair at the resonance frequency of the second measuring tube pair according to:

$$A'_{in,1} = A'_1(f_1, f_2, I_2) \cdot \frac{2 \cdot A_{in,1}}{A_{in,1} + A_{out,1}},$$

and to estimate a vibration amplitude $A'_{out,1}$ of an outlet-side sensor of a first measuring tube pair at the resonance frequency of the second measuring tube pair according to:

$$A'_{out,1} = A'_1(f_1, f_2, I_2) \cdot \frac{2 \cdot A_{out,1}}{A_{in,1} + A_{out,1}},$$

where $A'_1(f_1, f_2, I_2)$ is the frequency-dependent and excitation-current-dependent, mean sensor amplitude function for the first measuring tube pair, and where $A_{in,1}$ and $A_{out,1}$ are sensor signal amplitudes of the inlet-side and outlet-side sensors respectively at the first resonance frequency.

In a development of the invention, the operation and evaluation circuit is configured to estimate a vibration amplitude $A'_{in,2}$ of an inlet-side sensor of a second measuring tube pair at the resonance frequency of the first measuring tube pair according to:

$$A'_{in,2} = A'_2(f_2, f_1, I_1) \cdot \frac{2 \cdot A_{in,2}}{A_{in,2} + A_{out2}},$$

and to estimate a vibration amplitude $A'_{out,2}$ of an outlet-side sensor of a second measuring tube pair at the resonance frequency of the first measuring tube pair according to:

$$A'_{out,2} = A_2(f_2, f_1, I_1) \cdot \frac{2 \cdot A_{out,2}}{A_{in,2} + A_{out,2}},$$

$A'_2(f_2, f_1, I_1)$ is the frequency-dependent and excitation-current-dependent, mean sensor amplitude function for the second measuring tube pair, and where $A_{in,2}$ and $A_{out,2}$ are sensor signal amplitudes of the inlet-side and outlet-side sensors respectively at the resonance frequency of the second measuring tube pair.

In a development of the invention, the operation and evaluation circuit is configured
to use a signal amplitude of the inlet-side sensors at the first excitation mode natural frequency f1 normalized by a sensitivity constant and the first excitation mode natural frequency f1 as a measure of the vibration amplitude $A_{in1}$ of the first inlet-side sensor, and to use a signal amplitude of the outlet-side sensors at the first excitation mode natural frequency f1 normalized by a sensitivity constant and the first excitation mode natural frequency f1 as a measure of the vibration amplitude $A_{out1}$ of the first outlet-side sensor; and/or to use a signal amplitude of the inlet-side sensors at the second excitation mode natural frequency f2 normalized by a sensitivity constant and the excitation mode natural frequency f2 as a measure of the vibration amplitude $A_{in2}$ of the second inlet-side sensor, and to use a signal amplitude of the outlet-side sensors at the second excitation mode natural frequency f2 normalized by a sensitivity constant and the second excitation mode natural frequency f2 as a measure of the vibration amplitude $A_{out2}$ of the second outlet-side sensor;

In a development of the invention, the mean sensor amplitude function $A'_1(f_1, f_2, I_2)$ for the first measuring tube pair is given as:

$$A'_1 = \frac{e_{D,1} \cdot I_2 \cdot k_{N,1}}{\left|1 - \left(\frac{f_2}{f_1}\right)^2\right|},$$

where $e_{D,1}$ is an excitation efficiency for the first measuring tube pair and $k_{N,1}$ is a compliance of the first measuring tube pair for the flexural vibration excitation mode.

In a development of the invention, the mean sensor amplitude function $A'_2(f_2, f_1, I_1)$ for the second measuring tube pair is given as:

$$A'_2 = \frac{e_{D,2} \cdot I_1 \cdot k_{N,2}}{\left|1 - \left(\frac{f_1}{f_2}\right)^2\right|},$$

where $e_{D,2}$ is an excitation efficiency for the second measuring tube pair and $k_{N,2}$ is a compliance of the second measuring tube pair for the flexural vibration excitation mode.

In a development of the invention, the operation and evaluation circuit is configured to determine for the ratio of the vibration amplitudes a value which is a function of a ratio of the excitation mode natural frequencies to each other and of a quality factor which indicates the medium-dependent quality of one of the flexural vibration excitation modes.

In a development of the invention, the operation and evaluation circuit is configured to determine the quality factor as a function of the amplitude of the superimposed signals of the inlet-side or outlet-side sensors at a vibration of a measuring tube pair in a flexural vibration excitation mode at the associated excitation mode natural frequency and an amplitude of the exciter signal, especially, of the excitation current, or an amplitude of a control signal controlling the exciter signal at the excitation mode natural frequency.

In a development of the invention, the mean sensor amplitude function $A'_1(f_1, f_2, I_2)$ for the first measuring tube pair furthermore depends on the quality $Q_1$ of the first measuring tube pair and is given as:

$$A'_1(f_1, f_2, I_2, Q_1) = \frac{e_{D,1} \cdot I_2 \cdot k_{N,1}}{\left[\left(1 - \left(\frac{f_2}{f_1}\right)^2\right)^2 + \left(\frac{\left(\frac{f_2}{f_1}\right)}{Q_1}\right)^2\right]^{\frac{1}{2}}},$$

where $e_{D,1}$ is an excitation efficiency for the first measuring tube pair and $k_{N,1}$ is a compliance of the first measuring tube pair for the flexural vibration excitation mode, and wherein the quality $Q_1$ of the first measuring tube pair can be determined as:

$$Q_1 = \frac{A_{in1} + A_{out1}}{2 \cdot e_{D,1} \cdot I_1 \cdot k_{N,1}}.$$

In a development of the invention, the mean sensor amplitude function $A'_2(f_2, f_1, I_1)$ for the second measuring tube pair furthermore depends on the quality $Q_2$ of the second measuring tube pair and is given as:

$$A'_2(f_2, f_1, I_1, Q_2) = \frac{e_{D,2} \cdot I_1 \cdot k_{N,2}}{\left[\left(1 - \left(\frac{f_1}{f_2}\right)^2\right)^2 + \left(\frac{\left(\frac{f_1}{f_2}\right)}{Q_2}\right)^2\right]^{1/2}},$$

where $e_{D,2}$ is an excitation efficiency for the second measuring tube pair and $k_{N,2}$ is a compliance of the second measuring tube pair for the flexural vibration excitation mode, and wherein the quality $Q_2$ of the second measuring tube pair can be determined as:

$$Q_2 = \frac{A_{in2} + A_{out2}}{2 \cdot e_{D,2} \cdot I_2 \cdot k_{N,2}}.$$

In a development of the invention, the operation and evaluation circuit is configured to determine a proportionality factor $F_{1-2}$ of the zero-point error contribution of the first measuring tube pair to the zero-point error of the second measuring tube pair according to:

$$F_{1-2} = \frac{A'_{in,1}}{A_{in,2}} - \frac{A'_{out,1}}{A_{out,2}} \text{ or:}$$

$$F_{1-2} = \frac{2A'_1}{A_{in,1} + A_{out,1}} \cdot \left(\frac{A_{in,1}}{A_{in,2}} - \frac{A_{out,1}}{A_{out,2}}\right).$$

In a development of the invention, the operation and evaluation circuit is configured to determine a proportionality factor $F_{2-1}$ of the zero-point error contribution of the second measuring tube pair to the zero-point error of the first measuring tube pair according to:

$$F_{2-1} = \frac{A'_{in,2}}{A_{in,1}} - \frac{A'_{out,2}}{A_{out,1}} \text{ or:}$$

$$F_{2-1} = \frac{2A'_2}{A_{in,2} + A_{out,2}} \cdot \left(\frac{A_{in,2}}{A_{in,1}} - \frac{A_{out,2}}{A_{out,1}}\right).$$

In a development of the invention, the operation and evaluation circuit is configured to calculate a delay time $\tau_{1-2}$ corresponding to the zero-point error contribution of the first measuring tube pair to the zero-point error of the second measuring tube pair according to:

$$\tau_{1-2} = \frac{F_{1-2}}{2\pi \cdot f_2},$$

and/or
the operation and evaluation circuit is configured to calculate a delay time $\tau_{2-1}$ corresponding to the zero-point error contribution of the second measuring tube pair to the zero-point error of the first measuring tube pair according to:

$$\tau_{2-1} = \frac{F_{2-1}}{2\pi \cdot f_1},$$

In a development of the invention, the operation and evaluation circuit is configured to correct the flow-dependent delay times, determined in measuring mode, between the sensor signals at the excitation mode natural frequencies of the first and second measuring tube pairs $\tau_{m1}$, $\tau_{m2}$ by the zero-point delay times $\tau_{1-2}$, $\tau_{2-1}$ in order to calculate on the basis of the corrected delay times $\tau_{korr1}$, $\tau_{korr2}$ the mass flow through the respective measuring tube pair, where $\tau_{korr1} = \tau_{m1} - \tau_{m2-1}$ and $\tau_{korr2} = \tau_{m2} - \tau_{m1-2}$.

In a development of the invention, a relative deviation A between the first excitation mode natural frequency f1 and the second excitation mode natural frequency f2 is given as:

$$A = 2 \cdot \left| \frac{f1 - f2}{f1 + f2} \right|,$$

wherein the following applies: A>4%, for example A>8% and, especially, A>16%.

Insofar as the measuring tube pairs have a very high quality Q with Q>100, usually Q>1000, the measuring tube pairs vibrate virtually independently of each other at the frequency deviation A defined here. In addition, with such a frequency deviation, the interfering signals of the vibration sensors of the measuring tube pair vibrating out of resonance are reliably shifted by ±π/2 relative to the signals of the sensors of the measuring tube pair vibrating in resonance. This phase shift angle is thus dispensed with as a further degree of freedom, which could make zero-point correction even more difficult.

The method according to the invention serves for determining a mass flow measurement value of a medium flowing through a mass flow meter operating according to the Coriolis principle, especially, as claimed in any one of the preceding claims, wherein the mass flow meter has two measuring tube pairs with in each case two measuring tubes which are mounted so as to be able to vibrate against one another with one flexural vibration excitation mode, wherein the flexural vibration excitation modes of the two measuring tube pairs have excitation mode natural frequencies (f1, f2) differing from each other, wherein the two measuring tube pairs in each case have an electrodynamic exciter for exciting flexural vibrations between the measuring tubes of a measuring tube pair, wherein the two exciters are connected in series via an exciter conductor loop, wherein the measuring tube pairs in each case have a vibration sensor pair with an inlet-side vibration sensor and an outlet-side vibration sensor for detecting flexural vibrations at two points on a measuring tube pair; wherein an inlet-side sensor signal path is configured to transmit signals of the inlet-side vibration sensors in a superimposed manner, wherein an outlet-side sensor signal path is configured to transmit signals of the outlet-side vibration sensors in a superimposed manner, the method comprising the following steps: driving the two electrodynamic exciters with a common exciter signal, wherein the exciter signal serves to excite the flexural vibration excitation modes of both measuring tube pairs; detecting superimposed sensor signals of the two inlet-side vibration sensors; detecting superimposed signals of the two outlet-side vibration sensors; determining flow-dependent phase differences between the signals of the inlet-side and outlet-side vibration sensors of the vibration sensor pairs and for determining mass flow measurement values on the basis of these flow-dependent phase differences;

wherein the sensor signals at vibrations with the first excitation mode natural frequency f1 have a first signal amplitude ratio between the signals of the inlet-side sensors and the signals of the outlet-side sensors, wherein the sensor signals at vibrations with the second excitation mode natural frequency f2 have a second signal amplitude ratio between the signals of the inlet-side sensors and the signals of the outlet-side sensors, wherein the second signal amplitude ratio may differ from the first signal amplitude ratio due to manufacturing tolerances; performing a zero-point correction for a first of the measuring tube pairs and/or a second of the measuring tube pairs taking into account the first and second signal amplitude ratios or variables equivalent thereto when determining the mass flow measurement values on the basis of flow-dependent phase differences.

In a development of the invention, the zero-point correction for the first measuring tube pair and/or the second measuring tube pair takes place as a function of a deviation of the signal amplitude ratios relative to each other or variables equivalent thereto.

In a development of the invention, the zero-point correction for the first measuring tube pair has a term which depends on the current vibration amplitudes of the vibration sensors of the second measuring tube pair at the first excitation mode natural frequency f1 in relation to the current vibration amplitudes of the vibration sensors of the first measuring tube pair at the first excitation mode natural frequency, and/or In a development of the invention, the zero-point correction for the second measuring tube pair has a term which depends on the current vibration amplitudes of the vibration sensors of the first measuring tube pair at the second excitation mode natural frequency in relation to the current vibration amplitudes of the vibration sensors of the second measuring tube pair at the second excitation mode natural frequency.

In a development of the invention, in order to determine the vibration amplitudes of the vibration sensors of the first measuring tube pair, a mean sensor amplitude function $A_1'(f_1, f_2, I_2)$ at the excitation mode natural frequency of the second measuring tube pair is estimated, where $f_1$, $f_2$ are the resonance frequencies of the flexural vibration excitation modes of the first and second measuring tube pairs, where $I_2$ is an excitation current signal at the excitation mode natural frequency of the second measuring tube pair $f_2$, wherein the amplitudes of the inlet-side and outlet-side vibration sensors are determined as proportional to the mean sensor amplitude function.

In a development of the invention, in order to determine the vibration amplitudes of the vibration sensors of the second measuring tube pair, a mean sensor amplitude function $A_2'(f_2, f_1, I_1)$ at the excitation mode natural frequency of the first measuring tube pair is estimated, where $f_2$, $f_1$ are the resonance frequencies of the flexural vibration excitation modes of the second and first measuring tube pairs, where $I_1$ is an excitation current signal at the excitation mode natural frequency of the first measuring tube pair $f_1$, wherein the amplitudes of the inlet-side and outlet-side vibration sensors are determined as proportional to the mean sensor amplitude function.

In a development of the invention, a vibration amplitude $A'_{in,1}$ of an inlet-side sensor of a first measuring tube pair is estimated at the resonance frequency of the second measuring tube pair according to:

$$A'_{in,1} = A'_1(f_1, f_2, I_2) \cdot \frac{2 \cdot A_{in,1}}{A_{in,1} + A_{out,1}},$$

and a vibration amplitude $A'_{out,1}$ of an outlet-side sensor of a first measuring tube pair is estimated at the resonance frequency of the second measuring tube pair according to:

$$A'_{out,1} = A'_1(f_1, f_2, I_2) \cdot \frac{2 \cdot A_{out,1}}{A_{in,1} + A_{out,1}},$$

where $A'_1(f_1, f_2, I_2)$ is the frequency-dependent and excitation-current-dependent, mean sensor amplitude function for the first measuring tube pair, and where $A_{in,1}$ and $A_{out,1}$ are the sensor signal amplitudes of the inlet-side and outlet-side sensors respectively at the first resonance frequency, In a development of the invention, a vibration amplitude $A'_{in,2}$ of an inlet-side sensor of a second measuring tube pair is estimated at the resonance frequency of the first measuring tube pair according to:

$$A'_{in,2} = A'_2(f_2, f_1, I_1) \cdot \frac{2 \cdot A_{in,2}}{A_{in,2} + A_{out,2}},$$

and a vibration amplitude $A'_{out,2}$ of an outlet-side sensor of a second measuring tube pair is estimated at the resonance frequency of the first measuring tube pair according to:

$$A'_{out,2} = A'_2(f_2, f_1, I_1) \cdot \frac{2 \cdot A_{out,2}}{A_{in,2} + A_{out,2}},$$

where $A'_2(f_2, f_1, I_1)$ is the frequency-dependent and excitation-current-dependent mean sensor amplitude function for the second measuring tube pair, and where $A_{in,2}$ and $A_{out,2}$ are the sensor signal amplitudes of the inlet-side and outlet-side sensors respectively at the resonance frequency of the second measuring tube pair.

In a development of the invention, a proportionality factor $F_{1-2}$ of the zero-point error contribution of the first measuring tube pair to the zero-point error of the second measuring tube pair is determined according to:

$$F_{1-2} = \frac{A'_{in,1}}{A_{in,2}} - \frac{A'_{out,1}}{A_{out,2}} \text{ or } F_{1-2} = \frac{2A'_1}{A_{in,1} + A_{out,1}} \cdot \left(\frac{A_{in,1}}{A_{in,2}} - \frac{A_{out,1}}{A_{out,2}}\right).$$

In a development of the invention, a proportionality factor $F_{2-1}$ of the zero-point error contribution of the second measuring tube pair to the zero-point error of the first measuring tube pair is determined according to:

$$F_{2-1} = \frac{A'_{in,2}}{A_{in,1}} - \frac{A'_{out,2}}{A_{out,1}} \text{ or } F_{1-2} = \frac{2A'_2}{A_{in,2} + A_{out,2}} \cdot \left(\frac{A_{in,2}}{A_{in,1}} - \frac{A_{out,2}}{A_{out,1}}\right).$$

In a development of the invention, a zero-point delay time $\tau_{1-2}$ corresponding to the zero-point error contribution of the first measuring tube pair to the zero-point error of the second measuring tube pair is calculated according to:

$$\tau_{1-2} = \frac{F_{1-2}}{2\pi \cdot f_2},$$

In a development of the invention, a zero-point delay time $\tau_{2-1}$ corresponding to the zero-point error contribution of the second measuring tube pair to the zero-point error of the first measuring tube pair is calculated according to:

$$\tau_{2-1} = \frac{F_{2-1}}{2\pi \cdot f_1}.$$

In a development of the invention, the flow-dependent delay times determined in measuring mode between the sensor signals at the excitation mode natural frequencies of the first and second measuring tube pairs $\tau_{m1}$, $\tau_{m2}$ are corrected by the zero-point delay times $\tau_{1-2}$, $\tau_{2-1}$, in order to calculate on the basis of the corrected delay times $\tau_{korr1}$, $\tau_{korr2}$ the mass flow through the respective measuring tube pair, where $\tau_{korr1} = \tau_{m1} - \tau_{m2-1}$ and $\tau_{korr2} = \tau_{m2} - \tau_{m1-2}$.

BRIEF DESCRIPTION OF THE DRAWINGS

The invention is now described in further detail on the basis of an exemplary embodiment shown in the drawings. Shown are.

DETAILED DESCRIPTION

The exemplary embodiment shown in FIGS. 1a to 1d of a mass flow meter 100 according to the invention comprises four curved measuring tubes 110a, 110b, 110c, 110d. The measuring tubes 110a, 110b, 110c, 110d extend between an inlet-side collector 120 and an outlet-side collector 120, and are firmly connected to these, for example by rolling, brazing or welding. Extending between the collectors 120 is a solid carrier tube 124 firmly connected to both collectors, thereby rigidly coupling the collectors 120 together. On its upper side, the carrier tube 124 has openings through which the measuring tubes 110a, 110b, 110c, 110d are guided from the collectors 120 out of and into the carrier tube 124.

At each end, the collectors 120 have a flange 122, by means of which the mass flow meter is to be installed in a pipe. Through central openings 123 in the flanges 122, a mass flow is to be conducted through the mass flow meter 100, especially, its measuring tubes 110a, 110b, 110c, 110d, in order to measure the mass flow.

A first measuring tube 110a and a second measuring tube 110b are in each case connected at the inlet side and the outlet side to two node plates 132a, 134a, a free vibration length of a first measuring tube pair formed by the first measuring tube 110a and the second measuring tube 110b being defined by the position of the two inner of the node plates 132a, i.e., by those which are at the inlet side or outlet side in each case furthest away from the corresponding collector 120. This free vibration length has a great influence on a flexural vibration excitation mode of the first measuring tube pair, especially, on its excitation mode natural frequency with which the first measuring tube pair is to be excited. A third measuring tube 110c and a fourth measuring tube 110d are correspondingly connected at the inlet side and the outlet side, in each case to two node plates 132c, 134c, wherein a vibration length of a second measuring tube pair formed by the third measuring tube 110c and the fourth measuring tube 110d is defined by the position of the two inner of the node plates 132c, which vibration length again, especially, the excitation mode natural frequency, with which the second measuring tube pair is to be excited. Further node plates 134a, 134c, which are in each case arranged between the inner node plates 132a, 132c and the collectors 120, serve to define further vibration nodes in order to on the one hand reduce the maximum mechanical stresses on the vibrating measuring tubes and on the other hand minimize the exchange of vibration energy between the mass flow meter and the pipe. The free vibration length of the measuring tubes 110a, 110b of the first measuring tube pair is significantly greater than the free vibration length of the measuring tubes 110c, 110d of the second measuring tube pair, wherein the measuring tubes 110a, 110b of the first measuring tube pair oscillator are routed in a higher curve than the measuring tubes 110c, 110d of the second measuring tube pair. In the mass flow meter shown, which has measuring tubes with an outside diameter of 3 inches, i.e., approximately 76 mm, and a wall thickness of 3.6 mm, the measuring tube pairs have a excitation mode natural frequency of approximately 110 Hz and 160 Hz when the measuring tubes are filled with a medium having a density of water.

For exciting the flexural vibration excitation modes of the measuring tube pairs, a first exciter arrangement 140a is provided between the first measuring tube 110a and the second measuring tube 110b and a second exciter arrangement 140c is provided between the third measuring tube 110c and the fourth measuring tube 110d, for example in each case an inductive exciter arrangement comprising a plunger coil on a measuring tube and a plunger body on the opposite measuring tube of the measuring tube pair.

In order to detect the vibrations of the measuring tube pairs, in the longitudinal direction symmetrically to the exciter arrangements 140a, 140c, a first sensor arrangement 142a-1, 142a-2 and a second sensor arrangement 142c-1, 142c-2, each having an inlet-side and an outlet-side vibration sensor, are in each case provided and are each designed as an inductive arrangement with a plunger coil on one measuring tube and a plunger body on the other measuring tube. Details are known to the person skilled in the art and need not be explained here. For the sake of clarity, the positions of the exciter arrangement and the sensor arrangements were indicated only in FIG. 1b and provided with reference numerals.

Figure 1A:
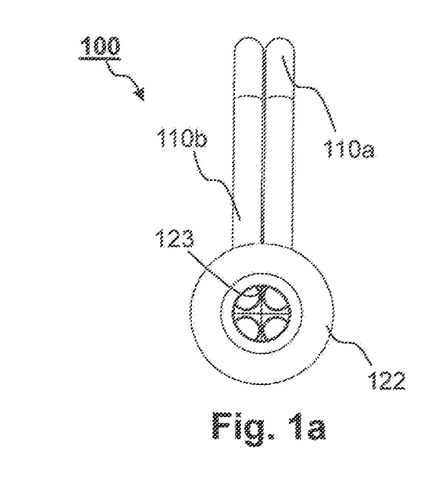
FIG. 1a shows a schematic front view of a first exemplary embodiment of a mass flow meter according to the present disclosure.
Figure 1B:
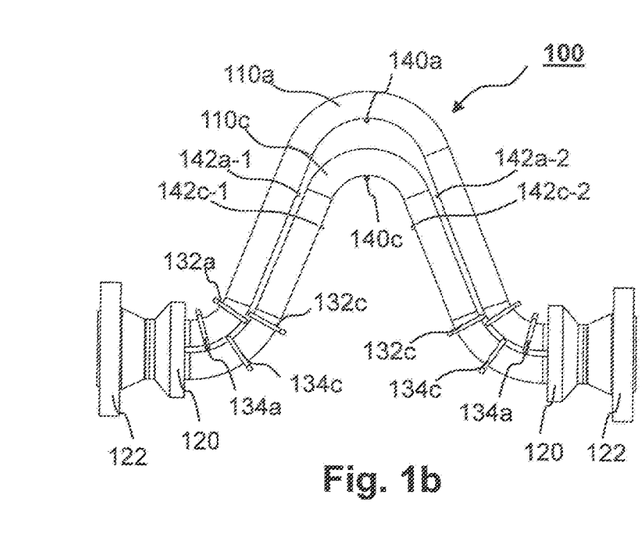
FIG. 1b shows a schematic side view of the first exemplary embodiment of a mass flow meter according to the present disclosure without a carrier tube.
Figure 1C:
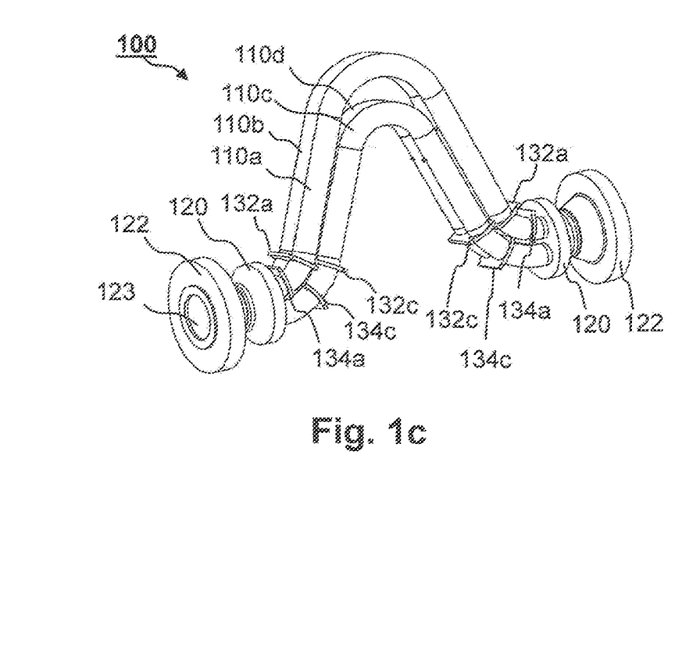
FIG. 1c shows a perspective view of the first exemplary embodiment of a mass flow meter according to the present disclosure without a carrier tube.
Figure 1D:
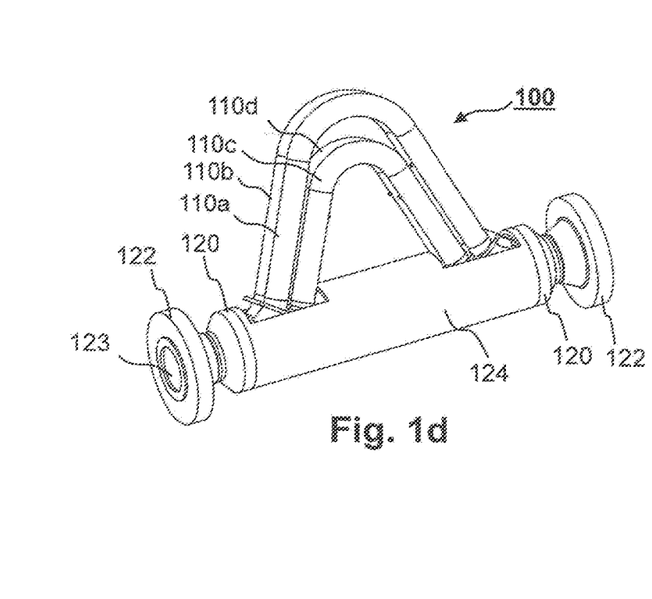
FIG. 1d shows a perspective view of the first exemplary embodiment of a mass flow meter according to the present disclosure with mounted carrier tube.
Figure 1E:
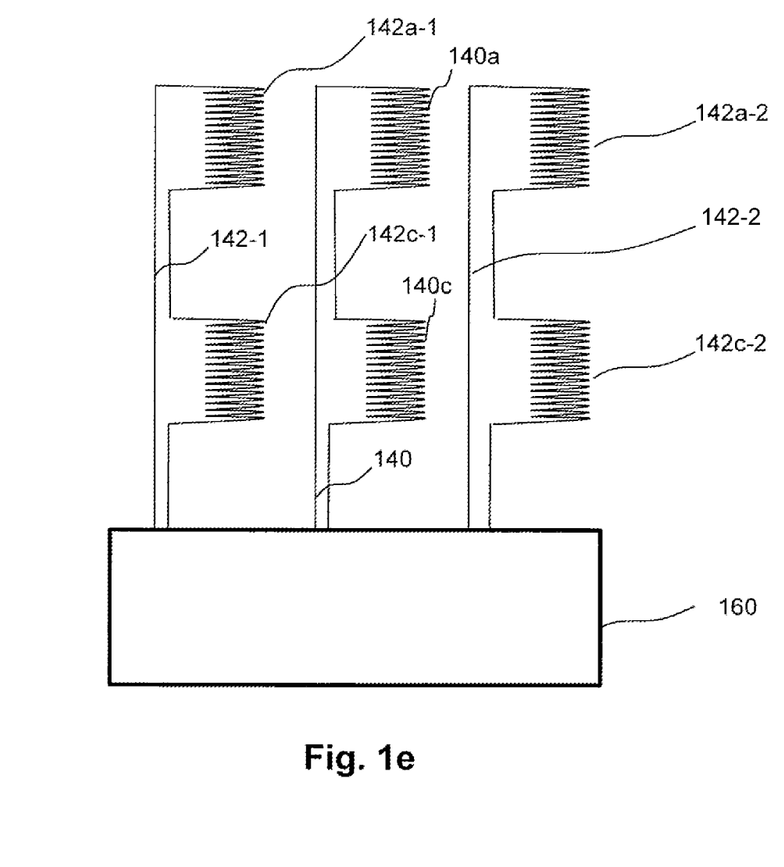
FIG. 1e shows a schematic representation of the circuitry of the vibration sensors and exciters of the first exemplary embodiment of a mass flow meter according to the present disclosure.

The measuring tube pairs are each to be excited with their current excitation mode natural frequency, wherein for this purpose the exciter arrangements 140a, 140c of the two measuring tube pairs are connected in series to the operation and evaluation circuit 160 via an exciter conductor loop 140, as schematically illustrated in FIG. 1e, so that a superimposed signal of the excitation mode natural frequencies of both measuring tube pairs can be applied to the exciter arrangements.

The two inlet-side vibration sensors 142a-1 and 142c-1 are connected in series via an inlet-side sensor conductor loop 142-1 and the two inlet-side vibration sensors 142a-2 and 142c-2 are connected in series via an outlet-side sensor conductor loop 142-2.

The two sensor conductor loops 142-1, 142-2 are connected to the operation and evaluation circuit 160 which is configured to drive the exciter conductor loop 140 and to detect and evaluate the signals of the two sensor conductor loops 142-1, 142-2.

Due to the high quality of the measuring tube pairs, the resonance vibrations at the respective excitation mode natural frequencies have an amplitude many times greater than the forced vibrations out of resonance at the excitation mode natural frequency of the respective other measuring tube pair. Nevertheless, the forced vibrations out of resonance can cause a zero-point error if the sensor signals have different amplitude ratios due to manufacturing tolerances.

Figure 2A:
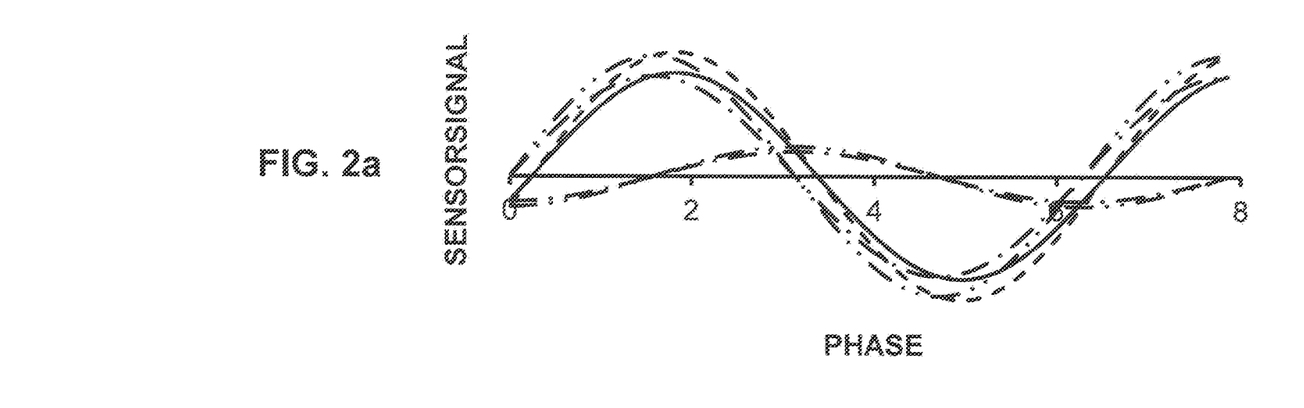
FIG. 2a shows a signal waveform of vibration sensor signals with equal amplitude ratios for the two measuring tube pairs.
Figure 2B:
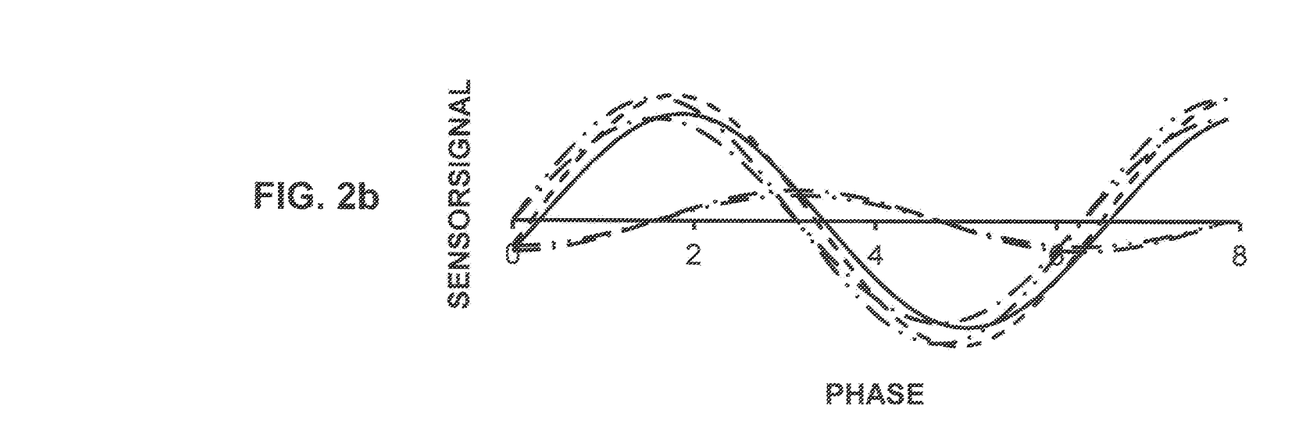
FIG. 2b shows a signal waveform of vibration sensor signals with different amplitude ratios for the two measuring tube pairs.

The resonant vibrations have their maximum amplitude at a phase angle of $\pi/2$ between the exciter signal and the deflection. In contrast, the forced vibrations out of resonance have a phase angle of 0 or $\pi$ between the exciter signal and the deflection. The superimposed vibration of a measuring tube pair at the excitation mode natural frequency of the other measuring tube pair therefore has a phase shift of $\pm\pi/2$ relative to its resonance vibration. Since the signals vibration sensors of both measuring tube pairs are detected via common sensor conductor loops, at the excitation mode natural frequency of one measuring tube pair, the signals of the vibration sensors of this measuring tube pair vibrating in resonance and the signals of the forced vibrations of the vibration sensors of the other measuring tube pair vibrating out of resonance are superimposed, the latter being shifted by $+\pi/2$ relative to the former. For an explanation of the situation, corresponding signal waveforms are shown in FIGS. 2a and 2b for a zero flow, wherein, for the sake of simplicity, both measuring tube pairs are excited only with the excitation mode natural frequency of one measuring tube pair. The single-dotted lines each show the isolated signal waveform of the inlet-side vibration sensors. The double-dotted lines each show an isolated signal waveform of the outlet-side vibration sensors. The amplitude of the measuring tube pair vibrating out of resonance is shown here greatly enlarged for clarification. The solid lines show the superimposed signal waveform of the inlet-side vibration sensors which waveform is actually detected via the inlet-side sensor conductor loop. The dashed lines show the superimposed signal waveform of the outlet-side vibration sensors which waveform is actually detected via outlet-side sensor conductor loop.

FIG. 2a shows different signal amplitudes for the inlet-side and outlet-side vibration sensors, the ratio of the signal amplitude of an inlet-side sensor and the signal amplitude of the associated outlet-side sensor being the same for both measuring tube pairs. In this case, they do not affect the phase relationship between the superimposed inlet-side and outlet-side signals. These have simultaneous zero crossings at zero flow.

If, in contrast, as shown in FIG. 2b, the ratio of the signal amplitude of an inlet-side sensor and the signal amplitude of the associated outlet-side sensor of the one measuring tube pair differs from that of the other, this will lead to a phase difference between the superimposed outlet-side and outlet-side signals which, in accordance with the measuring principle, causes a zero-point error if no further measures are taken.

According to the invention, the operation and evaluation circuit is designed to perform a zero-point correction for the first measuring tube pair and/or the second measuring tube pair when determining mass flow measurement values on the basis of flow-dependent phase differences, taking into account the first and second signal amplitude ratios or variables derived therefrom.

In the exemplary embodiment described here, the operation and evaluation circuit is designed to firstly determine the signal amplitudes at the two excitation mode natural frequencies in the signals of the inlet-side and the outlet-side sensor conductor loops. The signal amplitudes are virtually entirely attributable to the vibration sensors of the measuring tube pair whose excitation mode natural frequency is being considered since the interfering contribution of the vibration sensors of the respective other measuring tube pair is superimposed due to its forced vibration only with a low amplitude and a phase shift of $\pm\pi/2$ and thus hardly affects the amplitude.

The operation and evaluation circuit, which includes a microprocessor, calculates a first signal amplitude ratio between the signals of the inlet-side signal loop and of the outlet-side signal loop at the excitation mode natural frequency of the first measuring tube pair, and a second signal amplitude ratio at the between the signals of the inlet-side signal loop and of the outlet-side signal loop at the excitation mode natural frequency of the first measuring tube pair.

In one embodiment, the operation and evaluation circuit calculates a mean amplitude $A'_1(f_1, f_2, I_2)$ of the first measuring tube pair at the excitation mode natural frequency of the second measuring tube pair according to:

$$A'_1 = \frac{e_{D,1} \cdot I_2 \cdot k_{N,1}}{\left|1 - \left(\frac{f_2}{f_1}\right)^2\right|},$$

where $e_{D,1}$ is an excitation efficiency for the first measuring tube pair, $k_{N,1}$ a compliance of the first measuring tube pair for the flexural vibration excitation mode, and $I_2$ the amplitude of the excitation current at the excitation mode natural frequency of the second measuring tube pair.

In one embodiment, the operation and evaluation circuit further calculates a mean amplitude $A'_2(f_2, f_1, I_1)$ of the second measuring tube pair according to:

$$A'_2 = \frac{e_{D,2} \cdot I_1 \cdot k_{N,2}}{\left|1 - \left(\frac{f_1}{f_2}\right)^2\right|},$$

where $e_{D,2}$ is an excitation efficiency for the second measuring second pair, $k_{N,2}$ a compliance of the second measuring tube pair for the flexural vibration excitation mode, and $I_1$ the amplitude of the excitation current at the excitation mode natural frequency of the first measuring tube pair.

In one embodiment, the operating and evaluation circuit calculates further vibration amplitudes $A'_{in,1}$, $A'_{out,1}$, $A'_{in,2}$, $A'_{out,2}$ of the sensors in each case of one measuring tube pair at the excitation mode natural frequency of the other measuring tube pair by means of the determined mean vibration amplitude $A'_1$, $A'_2$ at the excitation mode natural frequency of the other measuring tube pair and on the basis of the signal amplitudes $A_{in,1}$, $A_{out,1}$, $A_{in,2}$, $A_{out,2}$ at their own excitation mode natural frequency according to:

$$A'_{in,1} = A'_1(f_1, f_2, I_2) \cdot \frac{2 \cdot A_{in,1}}{A_{in,1} + A_{out,1}},$$

$$A'_{out,1} = A'_1(f_1, f_2, I_2) \cdot \frac{2 \cdot A_{out,1}}{A_{in,1} + A_{out,1}},$$

$$A'_{in,2} = A'_2(f_2, f_1, I_1) \cdot \frac{2 \cdot A_{in,2}}{A_{in,2} + A_{out,2}},$$

$$A'_{out,2} = A'_2(f_2, f_1, I_1) \cdot \frac{2 \cdot A_{out,2}}{A_{in,2} + A_{out,2}}.$$

In one embodiment, the operation and evaluation circuit further calculates a proportionality factor $F_{1-2}$ of the zero-point error contribution of the first measuring tube pair to the zero-point error of the second measuring tube pair according to:

$$F_{1-2} = \frac{A'_{in,1}}{A_{in,2}} - \frac{A'_{out,1}}{A_{out,2}} \text{ or:}$$

$$F_{1-2} = \frac{2A'_1}{A_{in,1} + A_{out,1}} \cdot \left(\frac{A_{in,1}}{A_{in,2}} - \frac{A_{out,1}}{A_{out,2}}\right).$$

In one embodiment, the operation and evaluation circuit further calculates a proportionality factor $F_{2-1}$ of the zero-point error contribution of the second measuring tube pair to the zero-point error of the first measuring tube pair according to:

$$F_{2-1} = \frac{A'_{in,2}}{A_{in,1}} - \frac{A'_{out,2}}{A_{out,1}} \text{ or:}$$

$$F_{2-1} = \frac{2A'_2}{A_{in,2} + A_{out,2}} \cdot \left(\frac{A_{in,2}}{A_{in,1}} - \frac{A_{out,2}}{A_{out,1}}\right).$$

In one embodiment, the operation and evaluation circuit further calculates a zero-point delay time $\tau_{1\text{-}2}$ corresponding to the zero-point error contribution of the first measuring tube pair to the zero-point error of the second measuring tube pair according to:

$$\tau_{1-2} = \frac{F_{1-2}}{2\pi \cdot f_2},$$

In one embodiment, the operation and evaluation circuit further calculates a zero-point delay time $\tau_{2\text{-}1}$ corresponding to the zero-point error contribution of the second measuring tube pair to the zero-point error of the first measuring tube pair according to:

$$\tau_{2-1} = \frac{F_{2-1}}{2\pi \cdot f_1}.$$

In one embodiment, the operating and evaluation circuit further corrects the flow-dependent delay times determined in measuring mode between the sensor signals at the excitation mode natural frequencies of the first and second measuring tube pairs $\tau_{m1}$, $\tau_{m2}$ by the zero-point delay times $\tau_{1\text{-}2}$, $\tau_{2\text{-}1}$ in order to calculate on the basis of the corrected delay times $\tau_{korr1}$, $\tau_{korr2}$ the mass flow through the respective measuring tube pair, where $\tau_{korr1} = \tau_{m1} - \tau_{m2\text{-}1}$ and $\tau_{korr2} = \tau_{m2} - \tau_{m1\text{-}2}$.

Figure 3A:
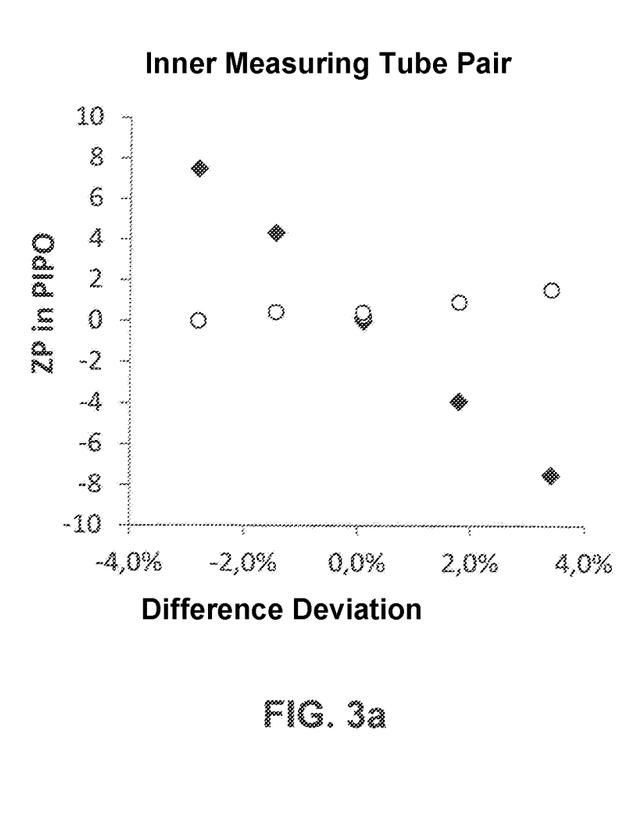
FIG. 3a shows deviations of the measured zero point for a first of the measuring tube pairs at zero flow with and without correction of the zero-point error.
Figure 3B:
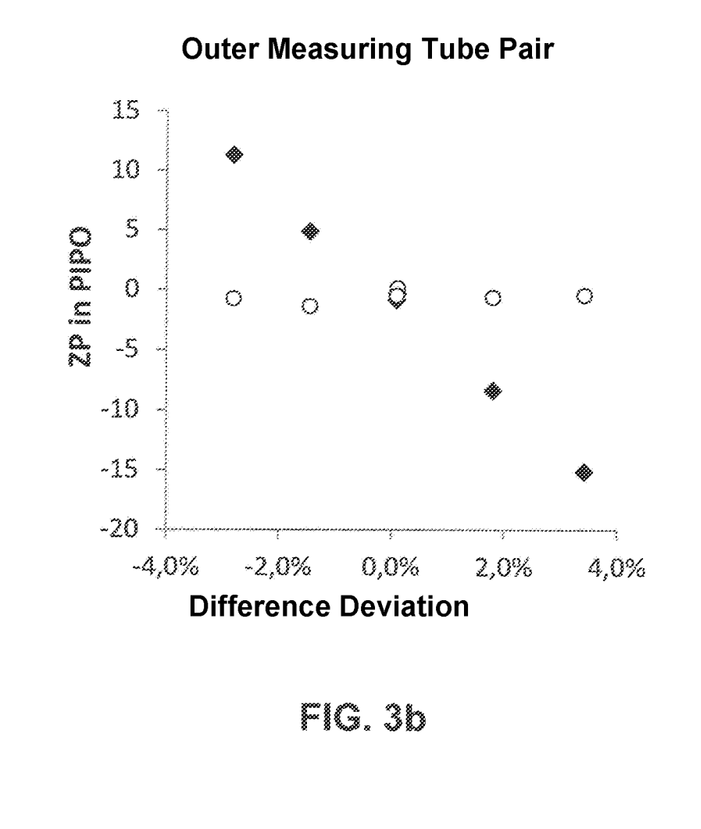
FIG. 3b shows deviations of the measured zero point for a second of the measuring tube pairs at zero flow with and without correction of the zero-point error.

FIGS. 3a and 3b each show a measurement value at zero flow in $10^{-5}$ parts of the measuring range for the inner or outer measuring tube pair as a function of differing signal amplitude ratios with and without application of the correction according to the invention. As a result, the flow meter according to the invention is suitable for reliably correcting the zero-point error.

Figure 4:
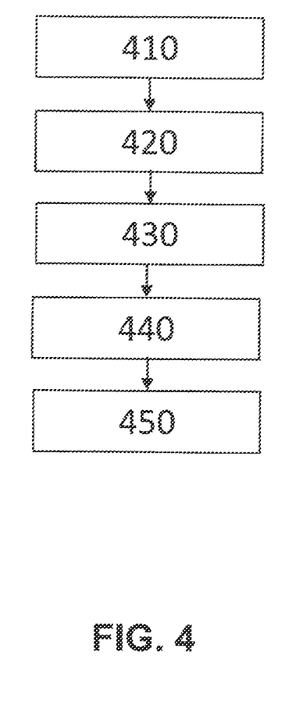
FIG. 4 shows a flow diagram of an exemplary embodiment of the method according to the present disclosure.

The method according to the invention ultimately comprises the steps illustrated in FIG. 4:

Driving the two electrodynamic exciters with a common exciter signal, the exciter signal serving to excite the flexural vibration excitation modes of the two measuring tube pairs (410);

Detecting superimposed sensor signals of the two inlet-side vibration sensors (420);

Detecting superimposed signals of the two outlet-side vibration sensors (430);

Determining flow-dependent phase differences between the signals of the inlet-side and outlet-side vibration sensors of the vibration sensor pairs (440) in order to determine mass flow measurement values on the basis of these flow-dependent phase differences;

wherein the sensor signals at vibrations with the first excitation mode natural frequency f1 have a first signal amplitude ratio between the signals of the inlet-side sensors and the signals of the outlet-side sensors, wherein the sensor signals at vibrations with the second excitation mode natural frequency f2 have a second signal amplitude ratio between the signals of the inlet-side sensors and the signals of the outlet-side sensors, Performing a zero-point correction (450) for a first of the measuring tube pairs and/or a second of the measuring tube pairs taking into account the first and second signal amplitude ratios or variables equivalent thereto when determining the mass flow measurement values on the basis of flow-dependent phase differences.

The invention claimed is:

1. A mass flow meter structured to operate according to the Coriolis principle to determine a mass flow measurement value of a medium flowing through the mass flow meter, comprising:

a first measuring tube pair including two measuring tubes mounted as to oscillate relative one another with a flexural vibration excitation mode which has a media-dependent first excitation mode natural frequency;

an electrodynamic first exciter configured to excite flexural vibrations between the measuring tubes of the first measuring tube pair;

a first vibration sensor pair including a first inlet-side vibration sensor and a first outlet-side vibration sensor, each configured to detect flexural vibrations at a different position on the first measuring tube pair;

a second measuring tube pair with two measuring tubes mounted as to oscillate relative against one another with a flexural vibration excitation mode which has a media-dependent second excitation mode natural frequency;

an electrodynamic second exciter configured to excite flexural vibrations between the measuring tubes of the second measuring tube pair;

a second vibration sensor pair including a second inlet-side vibration sensor and a second outlet-side vibration sensor, each configured to detect flexural vibrations at a different position on the second measuring tube pair; and an electronic circuit configured to drive the first and second exciters with a common exciter signal and detect sensor signals from the first and second vibration sensor pairs, to determine flow-dependent phase differences between the sensor signals of the inlet-side and outlet-side vibration sensors of one of the vibration sensor pairs, and to determine mass flow measurement values based on the flow-dependent phase differences, wherein:

the exciter signal excites the flexural vibration excitation modes of both the first measuring tube pair and the second measuring tube pair;

an exciter signal path is configured to transmit the exciter signal to the first and second exciters;

an inlet-side sensor signal path is configured to transmit sensor signals of the first and second inlet-side vibration sensors in a superimposed manner;

an outlet-side sensor signal path is configured to transmit sensor signals of the first and second outlet-side vibration sensors in a superimposed manner;

the sensor signals have a first signal amplitude ratio between the sensor signals of the inlet-side sensors and the sensor signals of the outlet-side sensors in response to vibrations at the first excitation mode natural frequency;

the sensor signals have a second signal amplitude ratio between the sensor signals of the inlet-side sensors and the sensor signals of the outlet-side sensors in response to vibrations at the second excitation mode natural frequency; and the electronic circuit is further configured to perform a zero-point correction for the first measuring tube pair and/or the second measuring tube pair when determining the mass flow measurement values, wherein the zero-point correction is a function of a relative deviation of the first and second signal amplitude ratios or of variables equivalent thereto.

2. The mass flow meter of claim 1, wherein the electronic circuit is configured:
to use a signal amplitude of the inlet-side sensors at the first excitation mode natural frequency normalized by a sensitivity constant and the first excitation mode natural frequency as a measure of the vibration amplitude of the first inlet-side sensor, and to use a signal amplitude of the outlet-side sensors at the first excitation mode natural frequency normalized by a sensitivity constant and the first excitation mode natural frequency as a measure of the vibration amplitude of the first outlet-side sensor; and/or
to use a signal amplitude of the inlet-side sensors at the second excitation mode natural frequency normalized by a sensitivity constant and the excitation mode natural frequency as a measure of the vibration amplitude of the second inlet-side sensor, and to use a signal amplitude of the outlet-side sensors at the second excitation mode natural frequency normalized by a sensitivity constant and the second excitation mode natural frequency as a measure of the vibration amplitude of the second outlet-side sensor.

3. The mass flow meter of claim 1, wherein the zero-point correction for the first measuring tube pair has a term that depends on current vibration amplitudes of the vibration sensors of the second measuring tube pair at the first excitation mode natural frequency in relation to current vibration amplitudes of the vibration sensors of the first measuring tube pair at the first excitation mode natural frequency, and/or
wherein the zero-point correction for the second measuring tube pair has a term that depends on current vibration amplitudes of the vibration sensors of the first measuring tube pair at the second excitation mode natural frequency in relation to current vibration amplitudes of the vibration sensors of the second measuring tube pair at the second excitation mode natural frequency.

4. The mass flow meter of claim 3, wherein the electronic circuit is configured to determine for the ratio of the vibration amplitudes a value which is a function of a ratio of the excitation mode natural frequencies with respect to each other and of a quality factor which indicates the media-dependent quality of one of the flexural vibration excitation modes.

5. The mass flow meter of claim 4, wherein the quality factor is a function of the amplitude of superimposed sensor signals of the inlet-side or outlet-side sensors at a vibration of a measuring tube pair in a flexural vibration excitation mode at the associated excitation mode natural frequency and an amplitude of the exciter signal or an amplitude of a control signal controlling the exciter signal at the excitation mode natural frequency.

6. The mass flow meter of claim 1, wherein, to determine the vibration amplitudes of the vibration sensors of the first measuring tube pair, the electronic circuit is configured to estimate a mean sensor amplitude function at the excitation mode natural frequency of the second measuring tube pair, $A_1'(f_1, f_2, I_2)$,
wherein $f_1, f_2$ are the resonance frequencies of the flexural vibration excitation modes of the first and second measuring tube pairs, respectively, and wherein $I_2$ is an excitation current signal with the excitation mode natural frequency of the second measuring tube pair,
wherein the amplitudes of the inlet-side and outlet-side vibration sensors of the first measuring tube pair are determined as proportional to the mean sensor amplitude function, and/or
wherein, to determine the vibration amplitudes of the vibration sensors of the second measuring tube pair, the electronic circuit is configured to estimate a mean sensor amplitude function at the excitation mode natural frequency of the first measuring tube pair, $A_2'(f_2, f_1, I_1)$,
wherein $I_1$ is an excitation current signal with the excitation mode natural frequency of the first measuring tube pair,
wherein the amplitudes of the inlet-side and outlet-side vibration sensors of the second measuring tube pair are determined as proportional to the mean sensor amplitude function.

7. The mass flow meter of claim 6, wherein the electronic circuit is configured to estimate a vibration amplitude $A'_{in,1}$ of an inlet-side sensor of a first measuring tube pair at the resonance frequency of the second measuring tube pair according to:

$$A'_{in,1} = A'_1(f_1, f_2, I_2) \cdot \frac{2 \cdot A_{in,1}}{A_{in,1} + A_{out,1}},$$

and to estimate a vibration amplitude $A'_{out,1}$ of an outlet-side sensor of a first measuring tube pair at the resonance frequency of the second measuring tube pair according to:

$$A'_{out,1} = A'_1(f_1, f_2, I_2) \cdot \frac{2 \cdot A_{out,1}}{A_{in,1} + A_{out,1}},$$

where $A'_1(f_1, f_2, I_2)$ is the frequency-dependent and excitation-current-dependent, mean sensor amplitude function for the first measuring tube pair, and where $A_{in,1}$ and $A_{out,1}$ are the sensor signal amplitudes of the inlet-side and outlet-side sensors respectively at the first resonance frequency, and/or
wherein the operation and evaluation circuit is configured to estimate a vibration amplitude $A'_{in,2}$ of an inlet-side sensor of a second measuring tube pair at the resonance frequency of the first measuring tube pair according to:

$$A'_{in,2} = A'_2(f_2, f_1, I_1) \cdot \frac{2 \cdot A_{in,2}}{A_{in,2} + A_{out,2}},$$

and to estimate a vibration amplitude $A'_{out,2}$ of an outlet-side sensor of a second measuring tube pair at the resonance frequency of the first measuring tube pair according to:

$$A'_{out,2} = A'_2(f_2, f_1, I_1) \cdot \frac{2 \cdot A_{out,2}}{A_{in,2} + A_{out,2}},$$

$A'_2(f_2, f_1, I_1)$ is the frequency-dependent and excitation-current-dependent, mean sensor amplitude function for the second measuring tube pair, and where $A_{in,2}$ and $A_{out,2}$ are the sensor signal amplitudes of the inlet-side and outlet-side sensors respectively at the resonance frequency of the second measuring tube pair.

8. The mass flow meter of claim 7, wherein the electronic circuit is configured to determine a proportionality factor $F_{1-2}$ of a zero-point error contribution of the first measuring tube pair to the zero-point error of the second measuring tube pair according to:

$$F_{1-2} = \frac{A'_{in,1}}{A_{in,2}} - \frac{A'_{out,1}}{A_{out,2}}, \text{ or}$$

$$F_{1-2} = \frac{2\,A'_1}{A_{in,1} + A_{out,1}} \cdot \left( \frac{A_{in,1}}{A_{in,2}} - \frac{A_{out,1}}{A_{out,2}} \right);$$

and/or wherein the electronic circuit is configured to determine a proportionality factor $F_{2-1}$ of a zero-point error contribution of the second measuring tube pair to the zero-point error of the first measuring tube pair according to:

$$F_{2-1} = \frac{A'_{in,2}}{A_{in,1}} - \frac{A'_{out,2}}{A_{out,1}}, \text{ or}$$

$$F_{2-1} = \frac{2\,A'_2}{A_{in,2} + A_{out,2}} \cdot \left( \frac{A_{in,2}}{A_{in,1}} - \frac{A_{out,2}}{A_{out,1}} \right).$$

9. The mass flow meter of claim 8, wherein the electronic circuit is configured to calculate a zero-point delay time $\tau_{1-2}$ corresponding to the zero-point error contribution of the first measuring tube pair to the zero-point error of the second measuring tube pair according to:

$$\tau_{1-2} = \frac{F_{1-2}}{2\pi \cdot f_2},$$

and/or wherein the electronic circuit is configured to calculate a zero-point delay time $\tau_{2-1}$ corresponding to the zero-point error contribution of the second measuring tube pair to the zero-point error of the first measuring tube pair according to:

$$\tau_{2-1} = \frac{F_{2-1}}{2\pi \cdot f_1}.$$

10. The mass flow meter of claim 9, wherein the electronic circuit is configured to correct the flow-dependent delay times determined in measuring mode between the sensor signals at the excitation mode natural frequencies of the first and second measuring tube pairs $\tau_{m1}$, $\tau_{m2}$ by the zero-point delay times $\tau_{1-2}$, $\tau_{2-1}$ to calculate the mass flow through the respective measuring tube pair based on the corrected delay times $\tau_{korr1}$, $\tau_{korr2}$, wherein $\tau_{korr1} = \tau_{m1} - \tau_{m2-1}$ and $\tau_{korr2} = \tau_{m2} - \tau_{m1-2}$.

11. The mass flow meter of claim 6, wherein the mean sensor amplitude function $A'_1(f_1, f_2, I_2)$ for the first measuring tube pair is given as:

$$A'_1 = \frac{e_{D,1} \cdot I_2 \cdot k_{N,1}}{\left| 1 - \left( \frac{f_2}{f_1} \right)^2 \right|},$$

wherein $e_{D,1}$ is an excitation efficiency for the first measuring tube pair and $k_{N,1}$ is a compliance of the first measuring tube pair for the flexural vibration excitation mode, and/or wherein the mean sensor amplitude function $A'_2(f_2, f_1, I_1)$ for the second measuring tube pair is given as:

$$A'_2 = \frac{e_{D,2} \cdot I_1 \cdot k_{N,2}}{\left| 1 - \left( \frac{f_1}{f_2} \right)^2 \right|},$$

wherein $e_{D,2}$ is an excitation efficiency for the second measuring tube pair and $k_{N,2}$ is a compliance of the second measuring tube pair for the flexural vibration excitation mode.

12. The mass flow meter of claim 11, wherein the mean sensor amplitude function $A'_1(f_1, f_2, I_2)$ for the first measuring tube pair furthermore depends on the quality, $Q_1$, of the first measuring tube pair and is given as:

$$A'_1(f_1, f_2, I_2, Q_1) = \frac{e_{D,1} \cdot I_2 \cdot k_{N,1}}{\left[ \left( 1 - \left( \frac{f_2}{f_1} \right)^2 \right)^2 + \left( \frac{\left( \frac{f_2}{f_1} \right)}{Q_1} \right)^2 \right]^{1/2}},$$

wherein $e_{D,1}$ is an excitation efficiency for the first measuring tube pair and $k_{N,1}$ is a compliance of the first measuring tube pair for the flexural vibration excitation mode, and wherein the quality of the first measuring tube pair can be determined as:

$$Q_1 = \frac{A_{in1} + A_{out1}}{2 \cdot e_{D,1} \cdot I_1 \cdot k_{N,1}},$$

and/or wherein the mean sensor amplitude function $A'_2(f_2, f_1, I_1)$ for the second measuring tube pair furthermore depends on the quality $Q_2$ of the second measuring tube pair and is given as:

$$A'_2(f_2, f_1, I_1, Q_2) = \frac{e_{D,2} \cdot I_1 \cdot k_{N,2}}{\left[ \left( 1 - \left( \frac{f_1}{f_2} \right)^2 \right)^2 + \left( \frac{\left( \frac{f_1}{f_2} \right)}{Q_2} \right)^2 \right]^{1/2}},$$

wherein $e_{D,2}$ is an excitation efficiency for the second measuring tube pair and $k_{N,2}$ is a compliance of the second measuring tube pair for the flexural vibration excitation mode, and wherein the quality $Q_2$ of the second measuring tube pair can be determined as:

$$Q_2 = \frac{A_{in2} + A_{out2}}{2 \cdot e_{D,2} \cdot I_2 \cdot k_{N,2}}.$$

13. The mass flow meter of claim 1, wherein a relative deviation A between the first excitation mode natural frequency f1 and the second excitation mode natural frequency f2 is greater than 4% and is calculated as:

$$A = 2 \cdot \left| \frac{f1 - f2}{f1 + f2} \right|.$$

14. A method for determining a mass flow measurement value using a mass flow meter structured to operate according to the Coriolis principle, wherein the mass flow meter comprises two measuring tube pairs each including two measuring tubes mounted as to oscillate relative one another with a flexural vibration excitation mode, wherein the flexural vibration excitation modes of the two measuring tube pairs have differing excitation mode natural frequencies, wherein each measuring tube pair includes an electrodynamic exciter configured to excite flexural vibrations between the two measuring tubes of the respective measuring tube pair, wherein the two exciters are connected in series via an exciter conductor loop, wherein each measuring tube pair includes a vibration sensor pair with an inlet-side vibration sensor and an outlet-side vibration sensor, both configured to detect flexural vibrations at two points on the respective measuring tube pair, wherein an inlet-side sensor signal path is configured to transmit sensor signals of the inlet-side vibration sensors in a superimposed manner, wherein an outlet-side sensor signal path is configured to transmit sensor signals of the outlet-side vibration sensors in a superimposed manner, the method comprising:
  driving the two electrodynamic exciters with a common exciter signal, wherein the exciter signal excites the flexural vibration excitation modes of the two measuring tube pairs;
  detecting the superimposed sensor signals of the two inlet-side vibration sensors;
  detecting the superimposed signals of the two outlet-side vibration sensors;
  determining flow-dependent phase differences between the sensor signals of the inlet-side and outlet-side vibration sensors of the vibration sensor pairs to determine mass flow measurement values based on the flow-dependent phase differences, wherein:
    the sensor signals at vibrations at a first excitation mode natural frequency have a first signal amplitude ratio between the sensor signals of the inlet-side sensors and the sensor signals of the outlet-side sensors; and
    the sensor signals at vibrations at a second excitation mode natural frequency have a second signal amplitude ratio between the sensor signals of the inlet-side sensors and the signals of the outlet-side sensors; and
  performing a zero-point correction for a first measuring tube pair of the measuring tube pairs and/or a second measuring tube pair of the measuring tube pairs based at least partially on the first and second signal amplitude ratios or variables equivalent thereto when determining the mass flow measurement values based on the flow-dependent phase differences, wherein the zero-point correction is performed at least partially as a function of a relative deviation of the first and second signal amplitude ratios or of the variables equivalent thereto.

15. The method of claim 14, wherein the zero-point correction for the first measuring tube pair has a term that depends on current vibration amplitudes of the vibration sensors of the second measuring tube pair at the first excitation mode natural frequency in relation to current vibration amplitudes of the vibration sensors of the first measuring tube pair at the first excitation mode natural frequency, and/or
  wherein the zero-point correction for the second measuring tube pair has a term that depends on current vibration amplitudes of the vibration sensors of the first measuring tube pair at the second excitation mode natural frequency in relation to current vibration amplitudes of the vibration sensors of the second measuring tube pair at the second excitation mode natural frequency.

16. The method of claim 14, wherein to determine the vibration amplitudes of the vibration sensors of the first measuring tube pair, a mean sensor amplitude function $A_1'(f_1, f_2, I_2)$ at the excitation mode natural frequency of the second measuring tube pair is estimated, where $f_1$, $f_2$ are the resonance frequencies of the flexural vibration excitation modes of the first and second measuring tube pairs, wherein $I_2$ is an excitation current signal with the excitation mode natural frequency of the second measuring tube pair $f_2$, wherein the amplitudes of the inlet-side and outlet-side vibration sensors are determined as proportional to the mean sensor amplitude function, and/or
  wherein to determine the vibration amplitudes of the vibration sensors of the second measuring tube pair, a mean sensor amplitude function $A_2'(f_2, f_1, I_1)$ at the excitation mode natural frequency of the first measuring tube pair is estimated, where $f_2$, $f_1$ are the resonance frequencies of the flexural vibration excitation modes of the second and first measuring tube pairs, where $I_1$ is an excitation current signal with the excitation mode natural frequency of the first measuring tube pair $f_1$, wherein the amplitudes of the inlet-side and outlet-side vibration sensors are determined as proportional to the mean sensor amplitude function.

17. The method of claim 16, wherein a proportionality factor $F_{1-2}$ of the zero-point error contribution of the first measuring tube pair to the zero-point error of the second measuring tube pair is determined according to:

$$F_{1-2} = \frac{A'_{in,1}}{A_{in,2}} - \frac{A'_{out,1}}{A_{out,2}}$$

or:

$$F_{1-2} = \frac{2 A'_1}{A_{in,1} + A_{out,1}} \cdot \left( \frac{A_{in,1}}{A_{in,2}} - \frac{A_{out,1}}{A_{out,2}} \right),$$

and/or
  wherein a proportionality factor $F_{2-1}$ of the zero-point error contribution of the second measuring tube pair to the zero-point error of the first measuring tube pair is determined according to:

$$F_{2-1} = \frac{A'_{in,2}}{A_{in,1}} - \frac{A'_{out,2}}{A_{out,1}}$$

or:

$$F_{2-1} = \frac{2 A'_2}{A_{in,2} + A_{out,2}} \cdot \left( \frac{A_{in,2}}{A_{in,1}} - \frac{A_{out,2}}{A_{out,1}} \right).$$

18. The method of claim 17, wherein a zero-point delay time $\tau_{1-2}$ corresponding to the zero-point error contribution of the first measuring tube pair to the zero-point error of the second measuring tube pair is calculated according to:

$$\tau_{1-2} = \frac{F_{1-2}}{2\pi \cdot f_2},$$

and/or
wherein a zero-point delay time $\tau_{2-1}$ corresponding to the zero-point error contribution of the second measuring tube pair to the zero-point error of the first measuring tube pair is calculated according to:

$$\tau_{2-1} = \frac{F_{2-1}}{2\pi \cdot f_1}.$$

19. The method of claim 18, wherein flow-dependent delay times determined in measuring mode between the sensor signals at the excitation mode natural frequencies of the first and second measuring tube pairs $\tau_{m1}$, $\tau_{m2}$ are corrected by the zero-point delay times $\tau_{1-2}$, $\tau_{2-1}$ to calculate on the basis of the corrected delay times $\tau_{korr1}$, $\tau_{korr2}$ the mass flow through the respective measuring tube pair, where $\tau_{korr1} = \tau_{m1} - \tau_{m2-1}$ and $\tau_{korr2} = \tau_{m2} - \tau_{m1-2}$.

20. The method of claim 14, wherein a vibration amplitude $A'_{in,1}$ of an inlet-side sensor of a first measuring tube pair at the resonance frequency of the second measuring tube pair is estimated according to:

$$A'_{in,1} = A'_1(f_1, f_2, I_2) \cdot \frac{2 \cdot A_{in,1}}{A_{in,1} + A_{out,1}},$$

and a vibration amplitude $A'_{out,1}$ of an outlet-side sensor of a first measuring tube pair at the resonance frequency of the second measuring tube pair is estimated according to:

$$A'_{out,1} = A'_1(f_1, f_2, I_2) \cdot \frac{2 \cdot A_{out,1}}{A_{in,1} + A_{out,1}},$$

wherein $A'_1(f_1, f_2, I_2)$ is the frequency-dependent and excitation-current-dependent, mean sensor amplitude function for the first measuring tube pair, and where $A_{in,1}$ and $A_{out,1}$ are the sensor signal amplitudes of the inlet-side and outlet-side sensors respectively at the first resonance frequency, and/or wherein a vibration amplitude of an inlet-side sensor of a second measuring tube pair at the resonance frequency of the first measuring tube pair is estimated according to:

$$A'_{in,2} = A'_2(f_2, f_1, I_1) \cdot \frac{2 \cdot A_{in,2}}{A_{in,2} + A_{out,2}},$$

and a vibration amplitude $A'_{out,2}$ of an outlet-side sensor of a second measuring tube pair is estimated at the resonance frequency of the first measuring tube pair according to:

$$A'_{out,2} = A'_2(f_2, f_1, I_1) \cdot \frac{2 \cdot A_{out,2}}{A_{in,2} + A_{out,2}},$$

$A'_2(f_2, f_1, I_1)$ is the frequency-dependent and excitation-current-dependent, mean sensor amplitude function for the second measuring tube pair, and where $A_{in,2}$ and $A_{out,2}$ are sensor signal amplitudes of the inlet-side and outlet-side sensors respectively at the resonance frequency of the second measuring tube pair.

* * * * *